(12) United States Patent
Liu et al.

(10) Patent No.: US 11,554,665 B1
(45) Date of Patent: Jan. 17, 2023

(54) METHOD OF DETECTING OF DRIVING UNDER INFLUENCE OF ALCOHOL BASED ON MQ3 SENSOR AND ULTRA WIDE BAND RADAR

(71) Applicant: Tianjin University, Tianjin (CN)

(72) Inventors: Xiulong Liu, Tianjin (CN); Keqiu Li, Tianjin (CN); Liyuan Ma, Tianjin (CN); Jiuwu Zhang, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 17/897,606

(22) Filed: Aug. 29, 2022

(51) Int. Cl.
*H04N 5/44* (2011.01)
*B60K 28/06* (2006.01)
*G01S 13/931* (2020.01)
*B60W 50/14* (2020.01)

(52) U.S. Cl.
CPC ............ *B60K 28/06* (2013.01); *B60W 50/14* (2013.01); *G01S 13/931* (2013.01); *B60W 2050/143* (2013.01)

(58) Field of Classification Search
CPC . B60K 28/06; B60W 50/14; B60W 2050/143; G01S 13/931
See application file for complete search history.

(56) References Cited

U.S. PATENT DOCUMENTS

| | | | | |
|---|---|---|---|---|
| 2005/0163383 A1* | 7/2005 | Kim | ...................... | G06V 40/18 382/209 |
| 2006/0215244 A1* | 9/2006 | Yosha | ................ | G02B 27/0101 359/15 |
| 2009/0090577 A1* | 4/2009 | Takahashi | .......... | G01N 33/4972 340/576 |
| 2009/0169068 A1* | 7/2009 | Okamoto | ............. | B60K 28/063 382/118 |
| 2011/0050407 A1* | 3/2011 | Schoenfeld | ........ | A61B 10/0051 340/426.11 |

(Continued)

FOREIGN PATENT DOCUMENTS

| | | |
|---|---|---|
| CN | 102163362 A | 8/2011 |
| CN | 107167802 A | 9/2017 |

(Continued)

OTHER PUBLICATIONS

First Office Action issued in counterpart Chinese Patent Application No. 202111002380.9, dated Apr. 27, 2022.

*Primary Examiner* — Munear T Akki
(74) *Attorney, Agent, or Firm* — Westbridge IP LLC

(57) ABSTRACT

Disclosed are a drinking under influence (DUI) detection system and a DUI detection method based on an MQ3 sensor and an ultra wide band (UWB) radar. The system includes an alcohol detection module, a respiratory detection module, a signal matching module and a drunk driving alarm module, and each module cooperates to complete a detection. The MQ3 sensor-based alcohol detection module is used for alcohol signal capture, alcohol sequence processing and DUI threshold detection; the UWB radar-based respiratory detection module is used for respiratory signal capture, respiratory signal processing and passenger separation and positioning; the signal matching module is used for periodic signal alignment, sequence feature matching and drinker identity confirmation; and the DUI alarm module is used for a system alarm prompt, a data visualization interface and a DUI information uploading.

1 Claim, 9 Drawing Sheets

(56) References Cited

U.S. PATENT DOCUMENTS

2011/0292209 A1* 12/2011 Morley ................ B60K 28/063
348/148
2012/0055726 A1* 3/2012 Hannon ............... B60K 28/063
180/272
2018/0082137 A1 3/2018 Melvin et al.

FOREIGN PATENT DOCUMENTS

| CN | 108888249 A | 11/2018 |
| CN | 109009124 A | 12/2018 |
| CN | 112115734 A | 12/2020 |
| CN | 112124073 A | 12/2020 |
| CN | 112220464 A | 1/2021 |
| CN | 112674721 A | 4/2021 |
| JP | H07244787 A | 9/1995 |

* cited by examiner

METHOD OF DETECTING OF DRIVING UNDER INFLUENCE OF ALCOHOL BASED ON MQ3 SENSOR AND ULTRA WIDE BAND RADAR

CROSS-REFERENCE TO RELATED APPLICATIONS

This application claims priority to Chinese Patent Application No. 202111002380.9, filed on Aug. 30, 2021, the contents of which are hereby incorporated by reference.

TECHNICAL FIELD

The application belongs to the field of wireless communication, and in particular to a system of detecting driving under the influence (DUI) of alcohol based on an MQ3 sensor technology and an ultra wide band (UWB) radar technology.

BACKGROUND

With a development of science and technology and social economy, vehicles have become a main means of transport for daily travelling of people, followed by an increase in traffic accidents, among which DUI is an important inducement of traffic accidents.

An ultra wide band (UWB) radar uses wireless carriers with a frequency bandwidth of more than 1 GHz. Instead of sinusoidal carriers, the UWB radar uses nanosecond non-sinusoidal narrow pulses to transmit data. UWB pulses used for positioning and ranging work in a frequency range of 6.5.8 GHz, and do not interfere with wireless transmissions in other frequency bands of a spectrum. This means that the UWB radar coexists with the most popular wireless forms, including satellite navigation, Wi-Fi and Bluetooth. The UWB radar has characteristics of a high data transmission speed, a low power consumption, an accurate positioning, a high security and simple realization of a system structure, and has unique advantages in detecting human vital signs. The UWB radar not only does not need any electrodes and sensors to touch a human body, so as to realize a real non-invasive detection, but also effectively penetrates a medium, solves problems that laser and infrared detections are seriously affected by a temperature and fail to block when encountering objects, and also overcomes the problems that an ultrasonic detection is interfered by a reflection of environmental impurities and fails to block by using a characteristic of detecting human life signals without being affected by the environmental temperature and heat. By using the related characteristics of UWB radar, an obstruction of foreign objects in the vehicle is avoided, respiratory signals in the vehicle are accurately obtained, located, and distinguished by corresponding processing, so as to extract a respiratory curve of each person.

A gas-sensitive material used in an MQ3 sensor (a semiconductor gas sensor for an alcohol detection) is tin dioxide ($SnO_2$) with a low conductivity in clean air. When there is alcohol vapor in a sensor's environment, the conductivity of the sensor increases with the increase of an alcohol gas concentration in the air. A simple circuit may be used to convert a change of conductivity into an output signal corresponding to a gas concentration. MQ3 gas sensor has a high sensitivity to alcohol and may resist an interference of gasoline, smoke and water vapor. This kind of sensor detects an alcohol atmosphere with various concentrations, and is a special sensor suitable for many applications. A near-infrared spectrum alcohol detection technology with similar functions detects a transmitted light of a hand of a driver, and performs a spectral analysis on the transmitted light in a specific band to obtain an alcohol transmittance in a body of the driver. Due to the interference of a large number of non-target components in blood and a strong noise of spectral signals, technical data is noisy and scene requirements are high. At present, a blood alcohol concentration detection and a respiratory alcohol concentration detection adopted by traffic police require staffs to actively collect information, so the MQ3 alcohol sensor is more suitable for detecting DUI.

SUMMARY

The application aims to propose a method of detecting driving under the influence (DUI) of alcohol based on an MQ3 sensor and an ultra wide band (UWB) radar. With a detection method of a respiratory signal extraction combined with an alcohol concentration matching, the UWB radar is used to detect and distinguish respiratory conditions of people in a vehicle, and the MQ3 sensor is used to obtain an alcohol concentration in the vehicle, and further match the alcohol concentration with a respiratory curve, and finally realize a function of a real-time alcohol detection and reporting, and a non-invasive real-time DUI detection.

The DUI detection method based on the MQ3 sensor and the UWB radar uses an MQ3 sensor-based alcohol detection module, a UWB radar-based respiratory detection module, a signal matching module and a DUI alarm module, and each module cooperates to complete a detection; the method specifically includes:

Step 1, carrying out a respiratory signal separation, specifically including:

Step 1-1, reading an output voltage value of a center console caused by a change of the alcohol concentration in a cab in real time by using the MQ3 sensor included in the alcohol detection module, and calculating a corresponding alcohol concentration value according to a sensitivity characteristic curve of the MQ3 sensor and a circuit output voltage of the MQ3 sensor, with a following expression:

$$\text{alcohol concentration value} = \text{pow}(11.5428 \ast 35.904 \ast V_{RL}/(25.5-5.1 \ast V_{RL}), 0.6549),$$

where $V_{RL}$ represents the output voltage of the MQ3 sensor;

Step 1-2, filtering alcohol concentration value sequences obtained in the Step 1-1 through a window, removing outliers and smoothing data, and then preliminarily judging whether a respiratory detection is needed based on an empirical threshold; if the threshold is exceeded, going to Step 1-3, otherwise, circularly executing the Step 1-2 to obtain the more accurate alcohol concentration and facilitate a subsequent respiratory matching;

Step 1-3, starting the respiratory detection module, collecting the respiratory signals of all passengers in a motor vehicle in real time by using the UWB radar, reconstructing collected I-Q signals, and further obtaining amplitude information and phase information;

Step 1-4, drawing a distance-time respiratory intensity two-dimensional matrix in the motor vehicle by using the amplitude information and time stamp information, and distinguishing the passengers with different seats according to different distance information between the different passengers and the UWB radar by using different respiratory data presented on the matrix;

Step 1-5, extracting a respiratory pattern of each user from the distance-time respiratory intensity two-dimensional matrix, and calculating a respiratory rate and other time series statistics after preprocessing such as an outlier removal, a baseline deviation, a discrete wavelet transforming noise reduction and a Butterworth filtering;

Step 1-6, establishing a respiratory curve of each user by using the respiratory pattern of each user, and matching the respiratory curve of each user with a real-time alcohol concentration value curve obtained by the MQ3 sensor;

Step 1-7, determining a drinker by sorting scores obtained by a feature matching algorithm when a number and identities of the users are known; further, judging that the drinker is DUI if the drinker has the lowest score, and then moving to Step 1-8; otherwise, going back to the Step 1-2; and Step 1-8, prompting by the vehicle alarm after obtaining the information of the DUI motor vehicle and the driver, and then uploading vehicle information to a traffic management department through an Internet of Things communication device of networked vehicles for a subsequent processing;

Step 2, executing an abnormal movement detection algorithm, specifically including:

Step 2-1, using the respiratory signals captured in the Step 1-3 as training data, and predicting an abnormal value of the respiratory signals by inputting into a long short-term memory (LSTM); judging that there is an abnormal movement if a difference from the real-time data exceeds the specified threshold, and moving to the Step 2-2; otherwise, circularly executing this step;

Step 2-2, verifying whether the corresponding time data in the alcohol concentration curve is an abnormal point by using an exponential moving average algorithm and according to the time information of abnormal data; moving to Step 2-3 if the corresponding time data is the abnormal point, otherwise, returning to the Step 2-1; and Step 2-3, concluding that the passenger corresponding to the respiratory curve of the abnormal point is the drinker, and completing a rapid DUI detection; and S3, matching respiratory curve features, specifically including:

Step 3-1, extracting feature values such as the respiratory rate, an amplitude mean square deviation, an autocorrelation coefficient and a waveform factor of each group of signal curves based on the respiratory signals captured in the Step 1-3 if the alcohol concentration calculated in the Step 1-2 exceeds the threshold;

Step 3-2, using the above feature values as the training data of a support vector machine (SVM) classification model, and establishing a detection model corresponding to breathers; and Step 3-3, calculating the feature values such as the respiratory rate, the amplitude mean square deviation, the autocorrelation coefficient, and the waveform factor of the alcohol concentration value curve obtained in real time as inputs, outputting whether the passenger drinks alcohol or not, and completing a classification, and determining the identity of the drinker.

Compared with the prior art, the application provides the efficient and accurate DUI detection for motor vehicle driving scenes, detects the alcohol concentration in the vehicle and the respiratory signals of all the passengers in real time, and quickly and accurately sends a DUI alarm prompt to the traffic department, thereby timely and effectively reducing a safety risk of DUI and improving road traffic safety.

BRIEF DESCRIPTION OF THE DRAWINGS

FIG. 4a shows a threshold value of alcohol concentrations calculated by using a periodic signal detection algorithm of an MQ3 sensor; and FIG. 4b shows asynchronous respiratory signals about each passenger.

DETAILED DESCRIPTION OF THE EMBODIMENTS

Technical schemes of the application are described in detail with reference to drawings and embodiments below.

Figure 1:
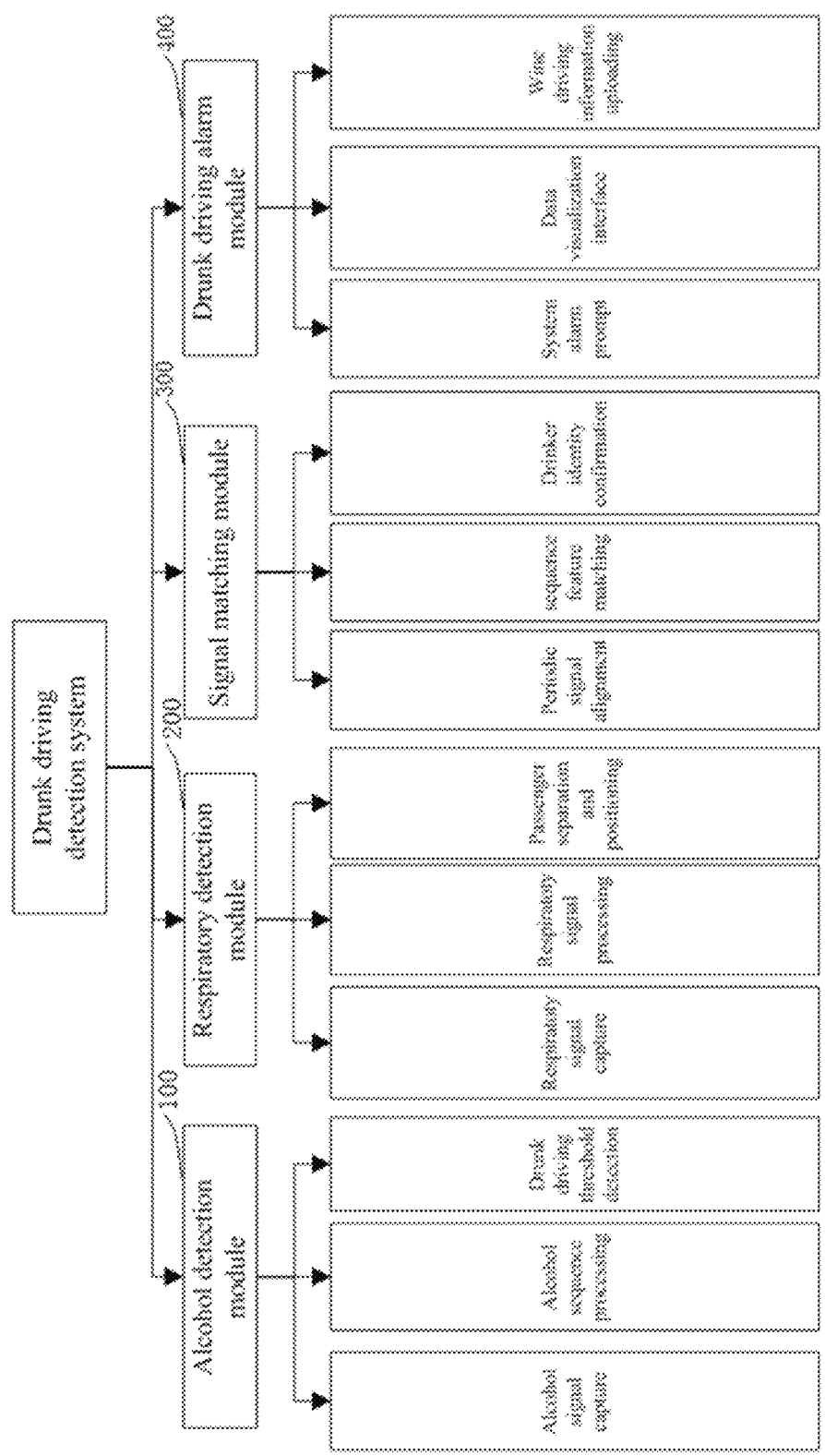
FIG. 1 is a schematic diagram of an overall structure of a driving under influence (DUI) detection system based on an MQ3 sensor and an ultra wide band (UWB) radar.

FIG. 1 shows an overall structure of a drunk driving detection system based on an MQ3 sensor and an ultra wide band (UWB) radar. The system includes an MQ3 sensor-based alcohol detection module 100, a UWB radar-based respiratory detection module 200, a signal matching module 300 and a driving under the influence of alcohol (DUI) alarm module 400, and each module cooperates to complete a detection.

The MQ3 sensor-based alcohol detection module 100 is used for an alcohol signal capturing, an alcohol sequence processing and a drunk driving threshold detecting; the UWB radar-based respiratory detection module 200 is used for respiratory signal capturing, a respiratory signal processing and a passenger separation and positioning; the signal matching module 300 is used for a periodic signal alignment, a sequence feature matching and a drinker identity confirmation; the DUI alarm module 400 is used for a system alarm prompt, a data visualization interface and a DUI information uploading.

Figure 2:
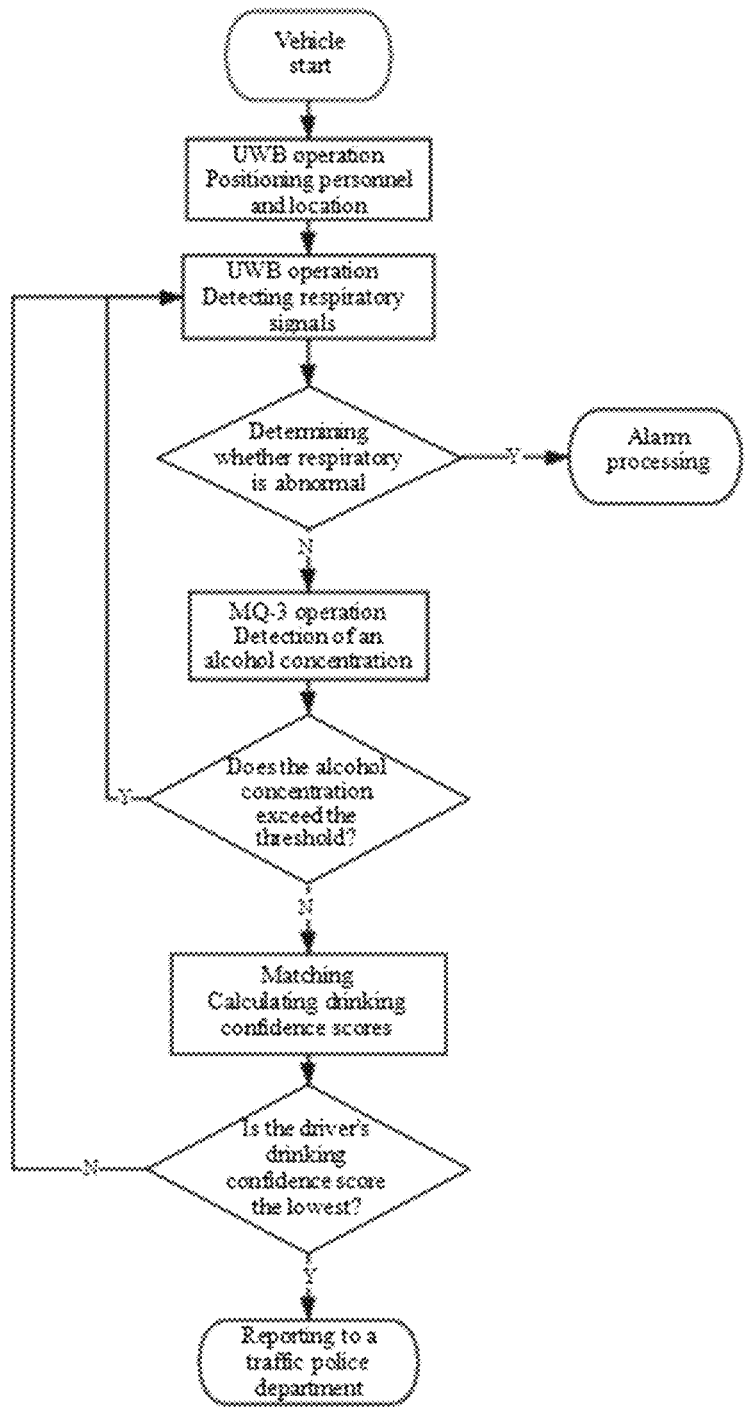
FIG. 2 is an overall flow diagram of a DUI detection method based on an MQ3 sensor and an ultra wide band (UWB) radar.
Figure 9:
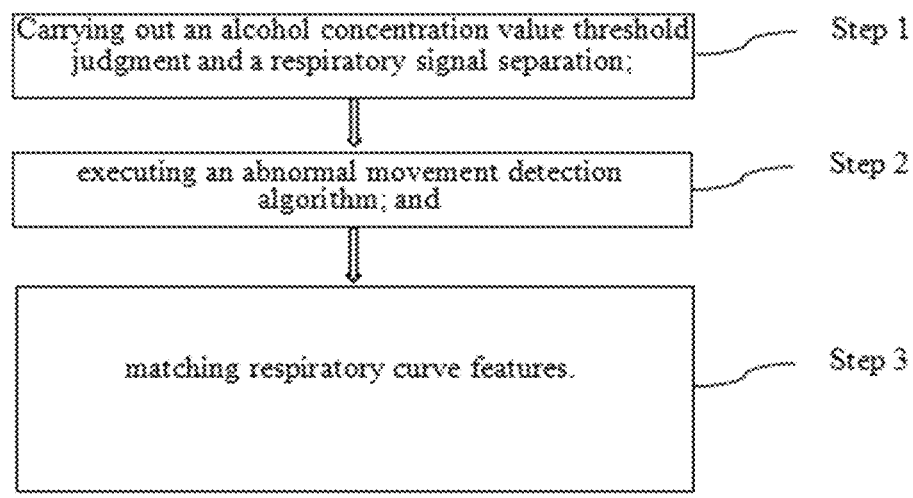
FIG. 9 is a flowchart of a driving under influence (DUI) detection system based on an MQ3 sensor and an ultra wide band (UWB) radar according to the application.

FIG. 2 shows an overall flow chart of a DUI detection method based on the MQ3 sensor and the UWB radar according to the application and FIG. 9 shows a flowchart of a DUI detection system based on the MQ3 sensor and the UWB radar according to the application.

Figure 6:
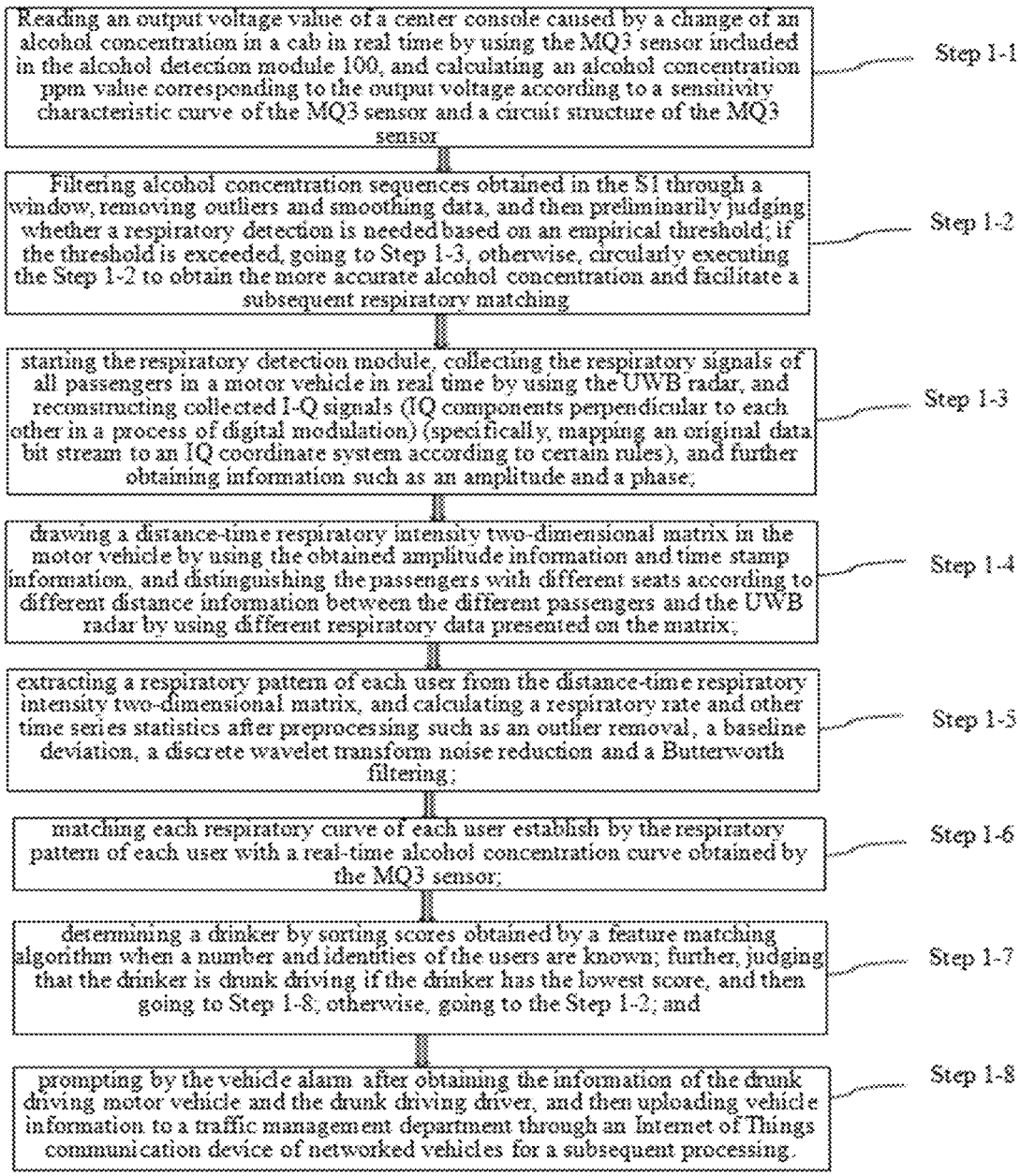
FIG. 6 is a flowchart of an ultra wide band (UWB) respiratory signal separation.

The method includes: Step 1, separating UWB respiratory signals, as shown in FIG. 6, specifically including following steps:

Step 1-1, reading an output voltage value of a center console caused by a change of an alcohol concentration in a cab in real time by using the MQ3 sensor included in the alcohol detection module 100, and calculating an alcohol concentration ppm value corresponding to the output voltage according to a sensitivity characteristic curve of the MQ3 sensor and a circuit structure of the MQ3 sensor; an expression of a sensitivity characteristic curve equation of the MQ3 sensor is as follows:

$$R_s/R_0 = 11.54 * ppm^{(-0.6549)} \quad (1),$$

where $R_s$ represents resistance values of the sensor under different concentrations of gas, and R0 represents the resistance value of the sensor when the alcohol concentration is 0 ppm.

Figure 5:
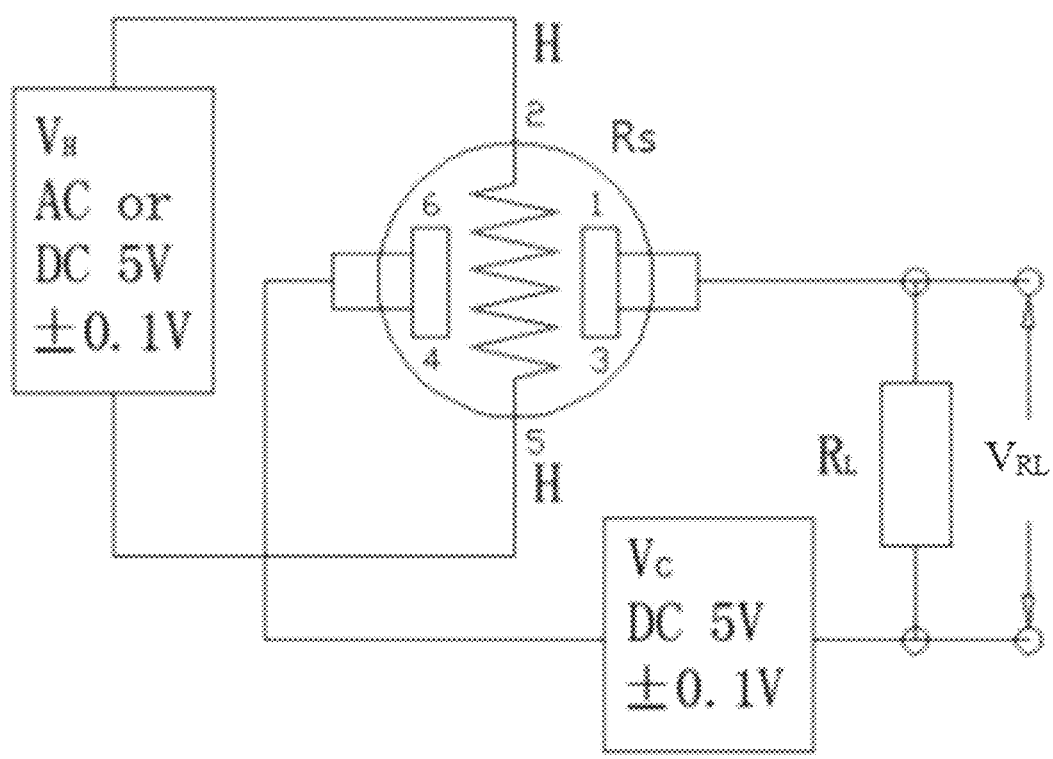
FIG. 5 is a circuit structure of an MQ3 sensor.

As shown in FIG. 5, the circuit structure of the MQ3 sensor is shown, and the expression of sensor output voltage $V_{RL}$ is as follows:

$$V_{RL}/R_L = (V_c - V_{RL})/R_s \quad (2),$$

where $V_{RL}$ represents the output voltage of the MQ3 sensor, RL represents an output resistance, and $V_c$ represents a loop test voltage with a value of 5 V.

The expression (1) and the expression (2) are combined, and the alcohol concentration ppm value is calculated corresponding to the output voltage by using a C standard library function pow (x, y); the expression is as follows:

alcohol concentration ppm value=pow
(11.5428*35.904*$V_{RL}$/(25.5−5.1*$V_{RL}$),0.6549).

Figure 7:
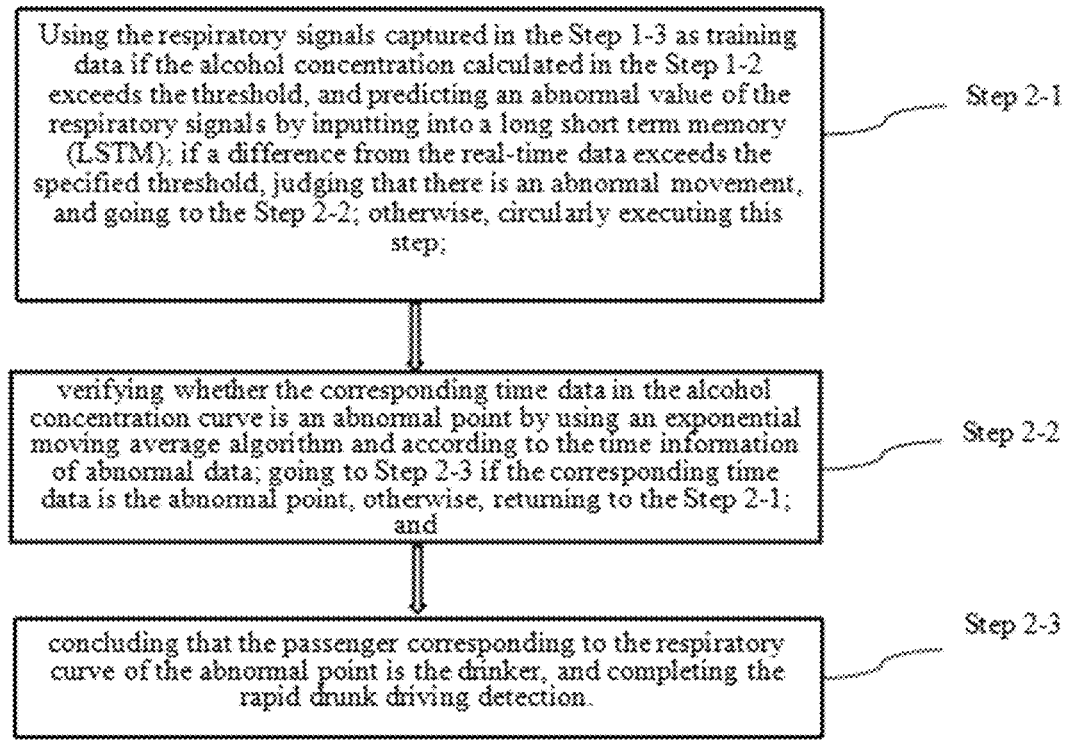
FIG. 7 is a flowchart of executing an abnormal movement detection algorithm.
Figure 8:
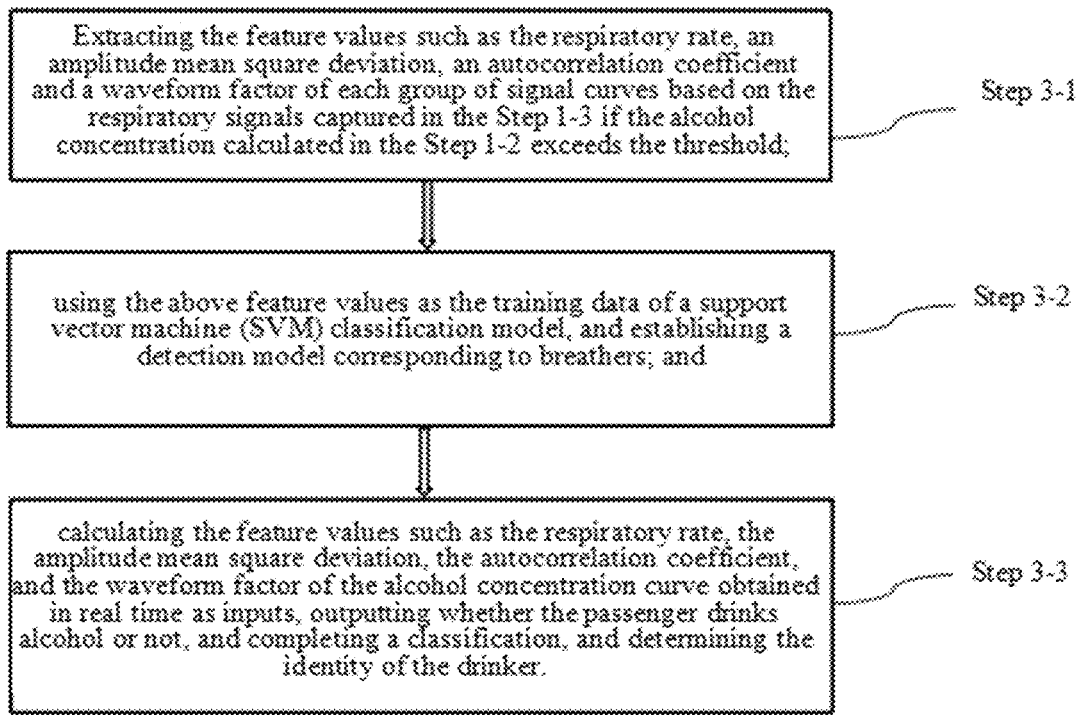
FIG. 8 is a schematic diagram of the flow of a respiratory curve feature matching.

The method further includes: Step 1-2, filtering alcohol concentration sequences obtained in the Step 1 through a window, removing outliers and smoothing data, and then preliminarily judging whether a respiratory detection is needed based on an empirical threshold; if the threshold is exceeded, going to Step 1-3, otherwise, circularly executing the Step 1-2 to obtain the more accurate alcohol concentration and facilitate a subsequent respiratory matching;

Step 1-3, starting the respiratory detection module, collecting the respiratory signals of all passengers in a motor vehicle in real time by using the UWB radar, and reconstructing collected I-Q signals (IQ components perpendicular to each other in a process of digital modulation) (specifically, mapping an original data bit stream to an IQ coordinate system according to certain rules), and further obtaining information such as an amplitude and a phase;

Step 1-4, drawing a distance-time respiratory intensity two-dimensional matrix in the motor vehicle by using the obtained amplitude information and time stamp information, and distinguishing the passengers with different seats according to different distance information between the different passengers and the UWB radar by using different respiratory data presented on the matrix;

Step 1-5, extracting a respiratory pattern of each user from the distance-time respiratory intensity two-dimensional matrix, and calculating a respiratory rate and other time series statistics after preprocessing such as an outlier removal, a baseline deviation, a discrete wavelet transform noise reduction and a Butterworth filtering;

Step 1-6, matching each respiratory curve of each user established by the respiratory pattern of each user with a real-time alcohol concentration curve obtained by the MQ3 sensor;

Step 1-7, determining a drinker by sorting scores obtained by a feature matching algorithm when a number and identities of the users are known; further, judging that the drinker is drunk driving if the drinker has the lowest score, and then going to Step 1-8; otherwise, going back to the Step 1-2; and Step 1-8, prompting by the vehicle alarm after obtaining the information of the DUI motor vehicle and the driver of DUI, and then uploading vehicle information to a traffic management department through an Internet of Things communication device of networked vehicles for a subsequent processing;

Step 2, executing an abnormal movement detection algorithm, as shown in FIG. 7, specifically including the following steps:

Step 2-1, using the respiratory signals captured in the Step 1-3 as training data if the alcohol concentration calculated in the Step 1-2 exceeds the threshold, and predicting an abnormal value of the respiratory signals by inputting into a long short-term memory (LSTM); if a difference from the real-time data exceeds the specified threshold, judging that there is an abnormal movement, and going to the Step 2-2; otherwise, circularly executing this step;

Step 2-2, verifying whether the corresponding time data in the alcohol concentration curve is an abnormal point by using an exponential moving average algorithm and according to the time information of abnormal data; going to Step 2-3 if the corresponding time data is the abnormal point, otherwise, returning to the Step 2-1; and Step 2-3, concluding that the passenger corresponding to the respiratory curve of the abnormal point is the drinker, and completing the rapid DUI detection; and S3, matching respiratory curve features, specifically including the following steps:

Step 3-1, extracting the feature values such as the respiratory rate, an amplitude mean square deviation, an autocorrelation coefficient and a waveform factor of each group of signal curves based on the respiratory signals captured in the Step 1-3 if the alcohol concentration calculated in the Step 1-2 exceeds the threshold;

Step 3-2, using the above feature values as the training data of a support vector machine (SVM) classification model, and establishing a detection model corresponding to breathers; and Step 3-3, calculating the feature values such as the respiratory rate, the amplitude mean square deviation, the autocorrelation coefficient, and the waveform factor of the alcohol concentration curve obtained in real time as inputs, outputting whether the passenger drinks alcohol or not, and completing a classification, and determining the identity of the drinker.

The main innovation of this application lies in a UWB respiratory signal separation algorithm, the abnormal movement detection algorithm, a respiratory curve feature matching algorithm and the method of combining them for the DUI detection.

Figure 3:
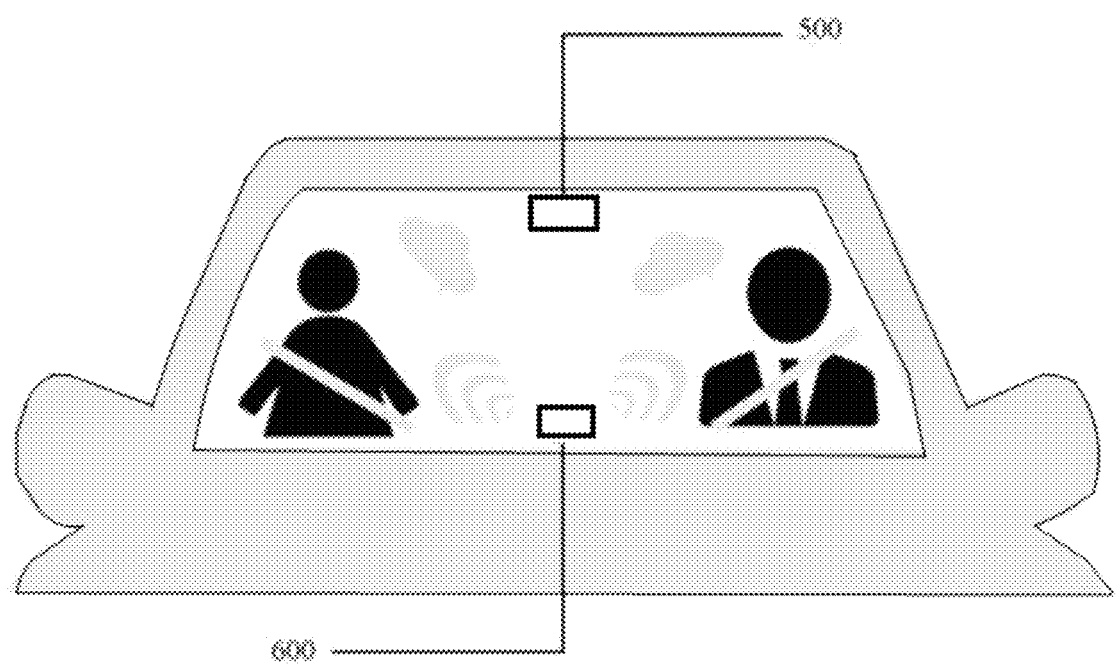
FIG. 3 is a schematic diagram of an example of an operation scenario.
Figure 4A:
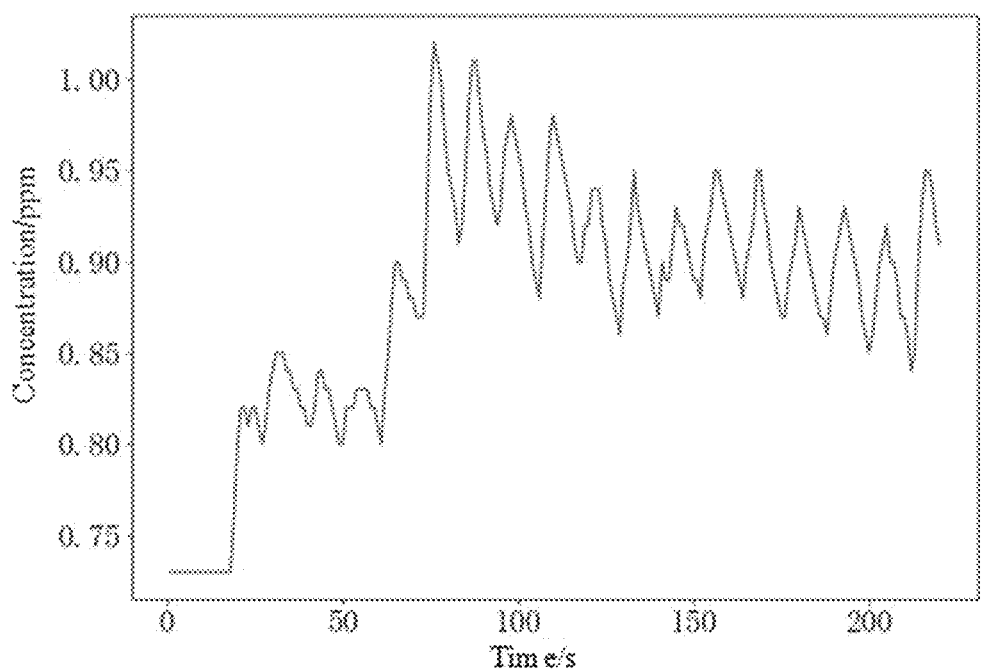
FIGS. 4a-4b are schematic diagrams of DUI detection data. Specifically.
Figure 4B:
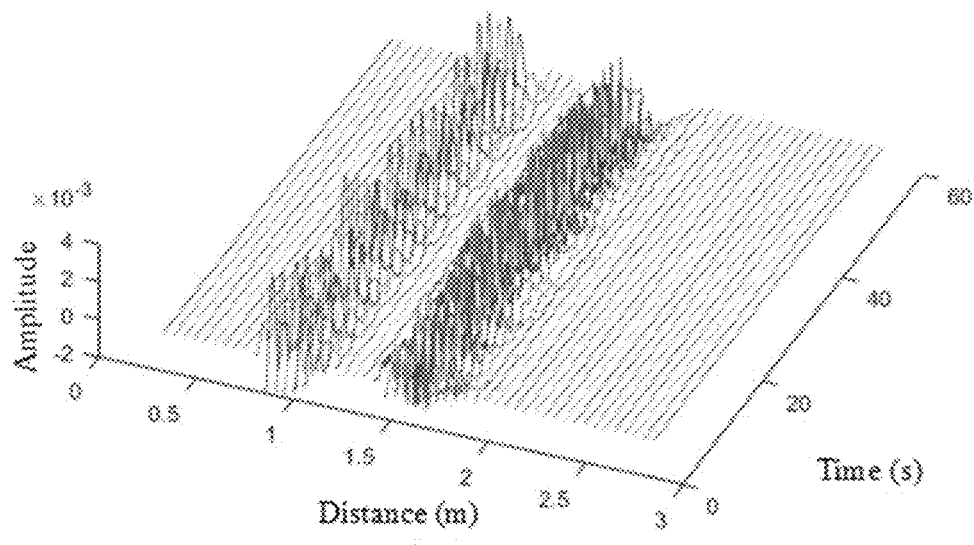

As shown in FIG. 3, it is a schematic diagram of an example of an operation scenario. The operation scenario includes an MQ3 sensor 500 arranged in the center console, and the UWB radar is arranged near an instrument panel in the motor vehicle. Specific embodiments of the application are described as follows:

firstly, a driving scene is initialized by using a UWB radar scanning technology; the specific operation steps are as follows:

Step 1-1, scanning the respiratory signals of the driving scene of the motor vehicle by using the UWB radar; and Step 1-2, obtaining the distance information by processing the respiratory signals obtained in the Step 1-1, so as to calculate the number and a position distribution of people in the driving scene;

Secondly, the specific steps of the DUI detection are as follows:

Step 2-1, detecting the alcohol concentration in the cab in real time by starting an MQ3 alcohol sensor; as shown in FIG. 4(*a*), determining whether to trigger a respiratory signal detection process by whether the alcohol concentration exceeds the alcohol concentration threshold calculated by a periodic signal detection algorithm of the MQ3 alcohol sensor;

Step 2-2, recording a respiratory signal waveform of each passenger in the driving scene in real time by triggering the UWB respiratory detection module if the alcohol concentration threshold is exceeded in the Step 2-1; as shown in FIG. 4(b), processing the respiratory signal of each passenger asynchronously to ensure a fluency of a real-time calculation;

Step 2-3, letting the UWB respiratory detection module enter a dormant state if the alcohol concentration threshold is not exceeded in the Step 2-1;

Step 2-4, matching the respiratory signal waveform with the alcohol concentration curve obtained by the MQ3 alcohol sensor by using a sequence feature matching algorithm according to the UWB respiratory signal of each passenger obtain in the Step 2-2, and calculating a drinking confidence score of each passenger, a reciprocal of the signal matching score; and Step 2-5, inferring according to the position distribution of the people in the driving scene obtained in the Step 1-2 and the drinking confidence score obtained in the Step 2-4; sending a DUI alarm prompt to the traffic department through the Internet of Things device by the system if the highest drinking confidence score is the driver; and letting the system enter a state of the Step 2-1 if a person with the highest drinking confidence score is not the driver.

Because an accuracy of results detected by the MQ3 alcohol sensor alone is greatly affected by environmental factors, such as respiratory interference of other drinking passengers, volatilization of other gases containing alcohol, etc., it is necessary to combine UWB respiratory detection technology to correct the results. The respiratory signals and the concentration of exhaled alcohol gas of the drinker are periodic with time, and the sequence feature matching algorithm is used to complete the matching and tracking, so as to accurately locate the drinker. In order to effectively reduce an energy consumption of the system, firstly, the alcohol concentration is detected by the alcohol sensor, and whether to start the UWB respiratory detection module and the respiratory signal matching module is decided according to whether the alcohol concentration exceeds the threshold.

The application combines advantages that MQ3 sensor technology may quickly and accurately capture alcohol gas concentration and UWB radar technology may realize a high-precision respiratory signal detection. In order to improve a working efficiency of the system, the application innovatively optimizes UWB respiratory detection method to meet requirements of the system. To sum up, there are following innovations:

firstly, real-time tracking and intelligent perception: using the UWB radar may detect the respiratory signals of multiple users at the same time, gives the specific number and the position distribution, so the accuracy and the efficiency of respiratory detection are significantly improved;

secondly, the feature matching and an accurate recognition: sequence information is refined and a driving state is accurately matched; problems of a low recognition accuracy caused by a simple use of the alcohol sensor and an inability to accurately locate the drinker so as to judge whether it is DUI are overcome;

thirdly, the application is easy to popularize, safe and efficient: advanced intelligent networked automobile equipment may quickly and accurately send the DUI alarm prompt to the traffic department, to timely and effectively reduce safety risks caused by drunk driving.

The advantages of the application include: firstly, accurate real-time detection of DUI is realized, accurate discrimination and analysis is carried out on a driver; secondly, it is necessary to be able to avoid a situation of surrogate testing, so as to combat fluky psychology; finally, DUI information is reported to relevant departments in real time for accurate interception. The system is easy to deploy and popularize.

What is claimed is:

1. A method of detecting driving under influence of alcohol based on an MQ3 sensor and a ultra wide band (UWB) radar, wherein an MQ3 sensor-based alcohol detection module, a ultra wide band (UWB) radar-based respiratory detection module, a signal matching module and a driving under influence of alcohol alarm module are used, and each module cooperates to complete a detection; and the method specifically comprises: Step 1, carrying out an alcohol concentration value threshold judgment and a respiratory signal separation, specifically comprising: Step 1-1, reading an output voltage value of a center console caused by a change of an alcohol concentration in a cab in real time by using the MQ3 sensor included in the alcohol detection module, and calculating a corresponding alcohol concentration value according to a sensitivity characteristic curve of the MQ3 sensor and a circuit output voltage of the MQ3 sensor, with a following expression:

$$\text{alcohol concentration value} = \text{pow}(11.5428*35.904*V_{RL}/(25.5-5.1*V_{RL}), 0.6549),$$

wherein $VR_L$ represents the output voltage of the MQ3 sensor, and pow is a standard library function of c; Step 1-2, filtering alcohol concentration value sequences obtained in the Step 1-1 through a window, removing outliers and smoothing data, and then preliminarily judging whether a respiratory detection is needed based on an empirical threshold; if the threshold is exceeded, going to Step 1-3, otherwise, circularly executing the Step 1-2 to obtain the more accurate alcohol concentration and facilitate a subsequent respiratory matching; Step 1-3, starting the respiratory detection module, collecting respiratory signals of all passengers in a motor vehicle in real time by using the UWB radar, reconstructing collected I-0 signals, and further obtaining amplitude information and phase information, wherein I and Q are mutually perpendicular components in a digital modulation process; Step 1-4, drawing a distance-time respiratory intensity two-dimensional matrix in the motor vehicle by using the amplitude information and time stamp information, and distinguishing the passengers with different seats according to different distance information between the different passengers and the UWB radar by using different respiratory data presented on the matrix; Step 1-5, extracting a respiratory pattern of each user from the distance-time respiratory intensity two-dimensional matrix, and calculating respiratory rate after preprocessing such as outlier removal, baseline deviation, discrete wavelet transform noise reduction and Butterworth filtering; Step 1-6, establishing a respiratory curve of each user by using the respiratory pattern of each user, and matching the respiratory curve of each user with a real-time alcohol concentration value curve obtained by the MQ3 sensor; Step 1-7, determining a drinker by sorting scores obtained by a feature matching algorithm when a number and identities of the users are known; further, judging that the drinker is drunk driving if the drinker has the lowest score, and then going to Step 1-8; otherwise, going to the Step 1-2; and Step 1-8, prompting by the vehicle alarm after obtaining the information of the drunk driving motor vehicle and the drunk driving driver, and then uploading vehicle information to a traffic management department through an Internet of Things communication device of networked vehicles for subsequent processing; Step 2, executing an abnormal movement detection algorithm, specifically comprising: Step 2-1, using the respiratory signals captured in the Step 1-3 as training data if the alcohol concentration value calculated in the Step 1-2 exceeds the threshold, and predicting an abnormal value of the respiratory signals by inputting it into a long short-term memory (LSTM); judging that there is an abnormal movement if a difference from the real-time data exceeds the specified threshold, and going to the Step 2-2; otherwise, circularly executing this step; Step 2-2, verifying whether the corresponding time data in the alcohol concentration curve is an abnormal point by using an exponential moving average algorithm and according to the time information of abnormal data; going to Step 2-3 if the corresponding time data is the abnormal point, otherwise, returning to the Step 2-1; and Step 2-3, concluding that the passenger corresponding to the respiratory curve of the abnormal point is the drinker, and completing a rapid drunk driving detection; and Step 3, matching respiratory curve features, specifically comprising: Step 3-1, extracting feature values such as the respiratory rate, an amplitude mean square deviation, an autocorrelation coefficient and a waveform factor of each group of signal curves based on the respiratory signals captured in the Step 1-3 if the alcohol concentration value calculated in the Step 1-2 exceeds the threshold; Step 3-2, using the above feature values as the training data of a support vector machine classification model, and establishing a detection model corresponding to breathers; and Step 3-3, calculating the feature values such as the respiratory rate, the amplitude mean square deviation, the autocorrelation coefficient, and the waveform factor of the alcohol concentration value curve obtained in real time as inputs, outputting whether the passenger drinks alcohol or not, and completing a classification, and determining the identity of the drinker.

\* \* \* \* \*